United States Patent Office 2,830,067
Patented Apr. 8, 1958

2,830,067

ORGANOTIN COMPOUNDS AND PROCESS OF PREPARATION

Hugh E. Ramsden, Metuchen, N. J., and Elliott L. Weinberg, Long Island City, N. Y., assignors to Metal & Thermit Corporation, New York, N. Y., a corporation of New Jersey No Drawing. Application January 18, 1954
Serial No. 404,794

20 Claims. (Cl. 260—429.7)

The present invention relates to the preparation of a six-fold coordinate organostannate derivative useful as a heat and light stabilizer for chlorinated materials such as vinyl chloride resins and the like and to stabilized compositions of matter containing said organostannate products. The products of this invention, furthermore, are six-fold coordinate organostannate derivatives containing both Sn—O and Sn—S bonds.

Many organotin compounds have heretofore been proposed as stabilizers for chlorine-containing resins. For the most part, these have been organotin salts of organic carboxylic acids in which the tin has been in the cation of the compound. Such compounds usually yield with the chlorine-containing resins, transparent, nearly water-white plastics with a considerable degree of resistance to discoloration by heat and/or light. They are, however, subject to spewing if used in too high a concentration and even sometimes at concentrations necessary to obtain adequate stabilization to heat and/or light. Several of these compounds have a tendency to cause sticking of a plastic formulation to the mill and calender rolls during processing.

This application is a continuation in part of U. S. application Serial No. 323,935 filed December 3, 1952, wherein is disclosed a new group of sulfur-containing organotin heat and light stabilizers for chlorine-containing plastics and resins, which do not cause graying when formulated with resins containing traces of lead, and which do not spew even when used in excessive quantities. These sulfur-containing stabilizers are the reaction products of an alcohol or alcohols, a dibasic acid, a bifunctional tin oxide and a mercaptoacid ester, wherein said products are present at least partially in the form of a six-fold coordinate compound.

In accordance with this invention the group of sulfur-containing organostannate stabilizers is the reaction product of an alcohol or alcohols, a dibasic acid, a bifunctional tin oxide and a mercaptoalkanol derivative.

The unique character of this new group of sulfur-containing organotin products is dependent upon at least a portion of the organotin or all of the organotin being present in the compound as a six-fold coordinate organostannate union. The new group of compounds may also involve the partial polymerization of more than one organostannate group to form di- or tri-organostannates. In laboratory preparation it is frequently possible to so control the action that only one unique product is the principal result of the reaction, but in commercial preparation certain materials may be obtained which are mixtures of several of the possible products of the group. In the stabilization of chlorine-containing compositions such mixtures are entirely suitable. The physical properties and characteristics of the organostannate products are dependent upon the type and ratio of the reactants used to produce the products. The products in themselves may be solids, viscous semi-solids or liquids.

The alcohol reactant may be a heterocyclic, substituted and unsubstituted, saturated and unsaturated aliphatic, or substituted and unsubstituted aromatic hydroxyl compound such as isooctyl alcohol, dihydroabietyl alcohol, octadecyl alcohol, lauryl alcohol, phenol, furfuryl alcohol, geraniol, etc. The dibasic acid may be a heterocyclic substituted, terpene substituted, saturated or unsaturated dicarboxy compound, such as maleic, itaconic, phthalic, succinic, adipic acids or anhydrides, etc. In this specification the term dibasic acid includes either the acid per se or the anhydride of the dibasic acid. The bifunctional tin oxide may be selected from di-alkyl, diaryl or di-aralkyl tin oxides such as dibutyl-, dimethyl-, ditolyl-, diphenyl-, dibenzyl-, tin oxides etc. Suitable mercaptoalkanol derivative reactants include, for example, such compounds as B-mercaptoethyl decanoate, B-mercaptoethyl di-isooctyl borate, 2 (or 3) mercaptopropyl-1-laurate, 1-mercaptopropyl-2-stearate, 2 (or 3 or 4) mercapto-n butyl-1-(2-ethylhexoate), o(or m or p) mercaptobenzyl benzoate, etc. The nature of the hydrocarbon groups of the alcohol, dibasic acid, organotin oxide, and mercaptoalkanol derivative is not of controlling importance. Any substituents may be used provided they are innocuous to the particular formulation and in the particular manner in which the finished compound is to be used.

Various procedures may be followed in preparing the sulfur-containing organotin compounds of this invention. However, we prefer to carry out the following reactions in the order given:

A. React the alcohol with the dibasic acid
B. React the product of A with an organotin oxide
C. React the product of B with a mercaptoalkanol derivative Reaction is carried out by mixing the ingredients and heating until the mass becomes clear. If more than one mole of acid per mole of alcohol is used the mass may have two layers but each will be clear. The temperature in this step is not critical but is usually kept within the range of about 75–100° C.

In carrying out reaction B the organotin oxide is gradually added to the clear, hot product of A. The reaction is exothermic and the temperature of the mixture rises initially without the application of external heat. After all the organotin oxide has been added it may be necessary to raise the temperature by supplying external heat in order to complete the reaction. The reaction is judged to be complete when the mass again becomes substantially clear. Preferably, the temperature is raised no higher than is necessary to effect this clarification. Usually a temperature of about 130° C. suffices.

Before reaction C is carried out the clear product from B is cooled to about room temperature, say to the range 25–50° C. and preferably 25–30° C. Then the mercaptoalkanol derivative is added to it. Reaction starts immediately and proceeds rapidly with evolution of heat. The reaction is judged to be complete when heat evolution ceases. The product of reaction C is the sulfur-containing organotin compound of our invention. It is desirable to cool the product of reaction B before proceeding with reaction C, since there is a tendency for the temperature to rise during reaction C due to the heat of reaction. In small batches the natural cooling of the reaction vessel usually suffices to keep the temperature from rising too high, but in large batches it may be advisable to remove the heat of reaction by cooling coils or water jackets.

The relative quantities of reactants utilizable in the obtention of the present reaction products may be varied over a wide range. It is essential, however, that certain broad limits be maintained to retain the advantages of the products of the present invention. The simplest form of product obtained has a generalized structure of the following type.

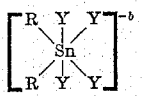

wherein $R$=alkyl, aryl or aralkyl, $Y$=coordination groups, coordinated through O or S and $b$ is a varying charge dependent upon the nature of the Y's.

It should be noted that the tin atom in the above structure is in an electronic condition analogous to that of the stannate ion.

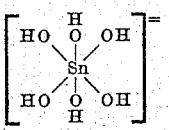

The stannate structure is modified by containing organic groups according to the theory postulated by Werner in which the hydroxo groups in the above stannate ion have been replaced by alkyl, aryl or aralkyl groups, by saturated alkyl thiol (RS) groups, carboxylate groups and carboxyl groups. The resulting organostannate ion has a residual ionic charge which may be satisfied by the presence of proton groups or simple positively charged bi-functional organotin ions. As an example of the type of structure which is produced in the present invention, the simplest product possible by the co-reaction of isooctyl alcohol, maleic anhydride, dibutyl tin oxide and B-mercaptoethyl decanoate would be either

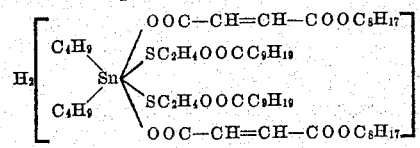

or

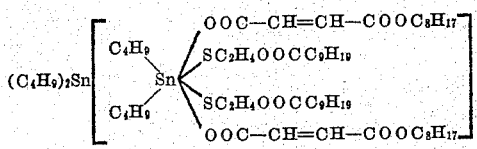

depending upon the amount of dibutyl tin oxide used in the reaction. That these products are not simple salts may be proved by varying the amount of mercaptoethyl decanoate used in the preparation. As long as the amount of mercaptoethyl decanoate used is stoichiometrically less than the amount required by the above required formulations, it will be found impossible to remove any of the mercaptoethyl decanoate by vacuum distillation. When the amount of mercaptoethyl decanoate added is about 10% in excess of that required by the above formulations, the excess over the stoichiometrically required amount may be recovered by vacuum distillation from the product.

In general terms the anions of the simplest members of the group of compounds claimed in this invention may have generalized structures as follows:
$R$=alkyl, aryl, aralkyl, $Q$=mercaptoalkanol residue, $D$=dibasic acid residue, $T$=alcohol residue

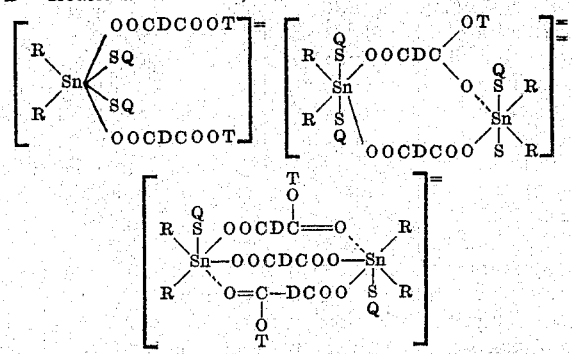

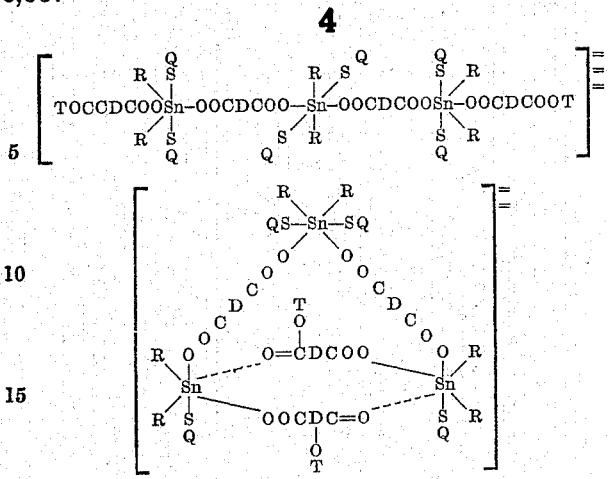

It can be readily recognized that the possible formulations of the tri stannate ions may be further extended by cross-linking of the adducts in many varied combinations. While we believe these above structures to fairly represent the anionic nature of the invention, we are not limited to the specific structure cited.

The organo stannate ions represented above may be electrically satisfied by the presence in the product of protons or of sufficient organotin cations to form neutral complexes.

The proportions of reactants need not be chosen so as to be stoichiometric for any particular one of the types since mixtures containing any of them are effective stabilizers. However, in order to realize the advantages of the products of this invention over prior art stabilizers, it is necessary that the relative proportions of the reactants meet the following criteria, wherein A defines the moles of alcohol, B defines the moles of dibasic acid, C defines the moles of organotin oxide and D defines the moles of mercaptoalkanol derivatives:

$\frac{A}{B}$ should be within the range of ½ to 1, $\frac{D}{B}$ should be within the range of 0.2 to 2, and $C$ should have a value between $\frac{2B-A+D}{2}$ to $\frac{2B-A}{2}$ One preferred product has equimolecular quantities of alcohol, dibasic acid, organotin oxide and mercaptoalkanol derivative. Another preferred product has the following molecular ratios:

$$\frac{A}{B}=\frac{1}{2}, C=\frac{2B-A}{2}$$

$$\frac{D}{B}=\text{about } 0.9$$

Still another preferred product may have the following molecular ratios:

$$\frac{A}{B}=\frac{2}{3}, C=\frac{2B-A}{2}$$

$$\frac{D}{B}=\text{about } 0.7$$

The following examples are further illustrative of these six-fold coordination compounds of diorganotin oxides and their preparation, and it will be understood that the invention is not limited thereto. The anhydride has been used in lieu of the acid because of ease of operation therewith.

*Example 1*

1 mole isooctyl alcohol and 1 mole maleic anhydride were heated in a glass container to a temperature of 75° C.–100° C., until the interaction was completed. 1 mole dibutyltin oxide was added gradually to the liquid mix at a temperature of 90–100° C. The oxide dissolved readily in said liquid with the initial evolution of heat. After all the oxide was added, the temperature was raised to 130° C. At this temperature, the mixture was filtered yielding a clear yellow liquid. This liquid was cooled to 25–30° C. To 22.3 gms. of the above reaction product was added 11.6 gms. of B-mercaptoethyl decanoate, yielding the desired stabilizer.

*Example II*

1 mole isooctyl alcohol, 1 mole maleic anhydride and 1 mole dibutyl tin oxide were treated as in Example I. To 19.2 gms. of this product was added 15.8 gms. B-mercaptoethyl di-isooctyl borate, yielding the desired stabilizer.

These organotin reaction products will function as stabilizers for compositions containing chlorinated materials, particularly vinyl chloride containing resin compositions such as vinyl chloride polymer and copolymer resins containing plasticizers, and when intimately dispersed therein, will provide plastic compositions of improved resistance to heat and light deterioration. Films are obtained from the aforesaid plastic compositions which exhibit a high degree of stability. The optimum concentration of the aforesaid organotin derivatives, useful as a stabilizer is about 1% based on the weight of the chlorinated material, although .3–10% may also be utilized. The chlorinated composition containing this concentration of stabilizer produces a stable plastic film, which does not darken at elevated temperatures as evidenced by the following results.

In order to test the behavior of the stabilizers of this invention in polyvinyl chloride plastics, the product of each of the examples given above was used to make up a plastic composition containing:

100 parts of a commercial polyvinyl chloride resin, known to contain about 7 parts per million of lead
50 parts of di-2-ethylhexyl phthalate (plasticizer)
1% by weight of the resins of stabilizer.

The ingredients were mixed, then milled at 320° F. on a differential speed, 2-roll mill for 5 minutes after which the plastic composition was taken off the mill as a sheet about 40 mils thick. 1″ x 6″ strips were cut from this sheet and subjected to aging in a circulating air oven at 350° F. Excellent heat stability of the sheets was found in each instance. Even after oven aging at 350° C. for an hour the test samples of Examples I and II were virtually colorless with very little color change. Other samples of the 40 mil sheets were exposed to aging in sunlight for about 1 month. No sweating or spewing was observed in any case. Excellent clarity and finish were obtained with the stabilizers of Examples I and II.

Other tests were made using other commercial polyvinyl chloride homo- and co-polymer resins in place of the lead-containing resin described above. In each instance the resulting plastic sheets were found to be highly stable to heat.

The product of the examples were also tested in compositions containing higher and lower concentrations of stabilizer. These all show a high order of heat stability.

The plastics prepared with 1% by weight of the stabilizers of this invention were also tested with regard to the staining of lead compound-stabilized plastics by the following procedure. A sample of the milled plastic sheet was clipped to a sheet of similar size made up from the following formulation:

100 parts polyvinyl chloride resin (Geon 101)
50 parts di-2-ethylhexyl phthalate
10 parts titanium dioxide pigment (Titanox A-LO)
2 parts basic lead carbonate
2 parts Dyphos (basic lead phosphite)
½ part DS-207 (dibasic lead stearate)

The two sheets held in contact by the clips were placed in a 4 ounce bottle which was then sealed and placed in a circulating air oven at 200° F. for 72 hours. Any staining of the white, lead stabilized sheet was then noted. The products of Examples I and II, did not show any stain. The light stabilizing effectiveness of several of the products of this invention were studied by means of Fade-O-Meter tests carried out on polyvinyl chloride plastic sheets containing them. They were found to be good light stabilizers, superior to many commercial light stabilizers.

Among the other uses of the organotin derivatives are their use as stabilizers for other chlorinated materials, as rubber accelerators, rubber antioxidants, lube oil additives, and polymerization accelerators.

While the invention has been described with reference to various examples and embodiments, it will be apparent to those skilled in the art that various modifications may be made, and equivalents substituted therefor, without departing from the principles and true nature of the present invention.

What is claimed is:

1. A method of preparing a sulfur-containing organotin compound which comprises: (1) esterifying B moles of a dibasic acid compound selected from the group consisting of dibasic acids of formula HOOCR′COOH and their anhydrides, with A moles of a hydroxy compound of formula ROH; (2) reacting the reaction product of (1) with C moles of an organotin oxide of formula R″$_2$SnO; (3) and reacting the reaction product of (2) with D moles of an ester selected from the group consisting of mercaptoalkanol esters of hydrocarbon monocarboxylic acids and mercaptoalkanol borates; wherein R and R″ are monovalent hydrocarbon radicals, R′ is a divalent hydrocarbon radical, $$\frac{A}{B}$$

is within the range of ½ to 1;

$$\frac{D}{B}$$

is within the range of .2 to 2; and C has a value of between $$\frac{2B-A+D}{2} \text{ to } \frac{2B-A}{2}$$

2. A process according to claim 1 wherein the ratio of $A:B:C:D=1:1:1:1$.

3. A process according to claim 1 wherein $$\frac{A}{B}=\frac{1}{2}, C=\frac{2B-A}{2}$$

and $$\frac{D}{B}=\text{about } 0.9$$

4. A process according to claim 1 wherein $$\frac{A}{B}=\frac{3}{4}, C=\frac{2B-A}{2}$$

and $$\frac{D}{B}=\text{about } 0.7$$

5. A method of preparing a sulfur-containing organotin stabilizer which comprises: esterifying B moles of a dibasic acid compound selected from the group consisting of dibasic acids of formula HOOCR′COOH and their anhydrides, with A moles of a hydroxy compound of formula ROH at a temperature of about 75–100° C. to form a liquid product; gradually adding to said liquid product and dissolving therein C moles of an organotin oxide of formula R″$_2$SnO; elevating the temperature of the mixture so formed to about 130° C. until the liquid clarifies, cooling said mixture to about room temperature and adding thereto D moles of an ester selected from the group consisting of mercaptoalkanol esters of hydrocarbon monocarboxylic acids and mercaptoalkanol borates; wherein R and R'' are monovalent hydrocarbon radicals, R' is a divalent hydrocarbon radical, $$\frac{A}{B}$$

is within the range of ½ to 1;

$$\frac{D}{B}$$

is within the range of .2 to 2; and C has a value of between $$\frac{2B-A+D}{2} \text{ to } \frac{2B-A}{2}$$

6. A process according to claim 5 wherein the ratio of $A:B:C:D=1:1:1:1$.

7. A process according to claim 5 wherein $$\frac{A}{B}=½, C=\frac{2B-A}{2}$$

and $$\frac{D}{B}=\text{about } 0.9$$

8. A process according to claim 5 wherein $$\frac{A}{B}=⅔, C=\frac{2B-A}{2}$$

and $$\frac{D}{B}=\text{about } 0.7$$

9. A method of preparing a sulfur-containing organotin compound which comprises reacting 1 mole of isooctyl alcohol and 1 mole of maleic anhydride at a temperature of about 75° C. to 100° C. until the reaction is completed and a liquid mix is formed, gradually adding 1 mole of dibutyltin oxide to said liquid mix at a temperature of about 90°–100° C., raising the temperature to 130° C. after all of said oxide is added, filtering the mixture at this temperature, whereby a clear yellow liquid is obtained, cooling the yellow liquid to about 25°–30° C., reacting about 11.6 gms. of β-mercaptoethyl decanoate with about 22.3 gms. of said yellow liquid and recovering the reaction product.

10. A method of preparing a sulfur-containing organotin compound which comprises reacting 1 mole of isooctyl alcohol and 1 mole of maleic anhydride at a temperature of about 75° to 100° C. until the reaction is completed and a liquid mix is formed, gradually adding 1 mole of dibutyltin oxide to said liquid mix at a temperature of about 90°–100° C., raising the temperature to 130° C. after all of said oxide is added, filtering the mixture at this temperature, whereby a clear yellow liquid is obtained, cooling the yellow liquid to about 25°–30° C., reacting about 19.2 gms. of this product with about 15.8 gms. of β-mercaptoethyl diisooctyl borate, and recovering the reaction product.

11. As a composition of matter the reaction product of the process of claim 1.

12. As a composition of matter the reaction product of the process of claim 2.

13. As a composition of matter the reaction product of the process of claim 3.

14. As a composition of matter the reaction product of the process of claim 4.

15. As a composition of matter the reaction product of the process of claim 5.

16. As a composition of matter the reaction product of the process of claim 6.

17. As a composition of matter the reaction product of the process of claim 7.

18. As a composition of matter the reaction product of the process of claim 8.

19. As a composition of matter the reaction product of the process of claim 9.

20. As a composition of matter the reaction product of the process of claim 10.

References Cited in the file of this patent

UNITED STATES PATENTS

| | | |
|---|---|---|
| 2,476,422 | Leininger | July 19, 1949 |
| 2,477,349 | Richard | July 26, 1949 |
| 2,604,483 | Mack et al. | July 22, 1952 |
| 2,626,954 | Albert | Jan. 27, 1953 |
| 2,648,650 | Weinberg et al. | Aug. 11, 1953 |